(12) United States Patent
Swidersky et al.

(10) Patent No.: US 8,163,104 B2
(45) Date of Patent: Apr. 24, 2012

(54) FLUXING AGENT

(75) Inventors: Hans-Walter Swidersky, Hannover (DE); Thomas Born, Holle/Sottrum (DE)

(73) Assignee: Solvay Fluor GmbH, Hannover (DE)

( * ) Notice: Subject to any disclaimer, the term of this patent is extended or adjusted under 35 U.S.C. 154(b) by 1359 days.

(21) Appl. No.: 11/453,922

(22) Filed: Jun. 16, 2006

(65) Prior Publication Data

US 2006/0231162 A1    Oct. 19, 2006

Related U.S. Application Data

(63) Continuation of application No. PCT/EP2004/013759, filed on Dec. 3, 2004.

(30) Foreign Application Priority Data

Dec. 17, 2003 (DE) .................................. 103 59 222

(51) Int. Cl.
*B22K 35/34* (2006.01)

(52) U.S. Cl. .......................................... 148/23; 148/25

(58) Field of Classification Search ............ 148/23
See application file for complete search history.

(56) References Cited

U.S. PATENT DOCUMENTS

| 3,149,007 A | | 9/1964 | Chamer |
| 3,171,734 A | | 3/1965 | Berson et al. |
| 3,479,231 A | * | 11/1969 | Joseph ............................ 75/252 |
| 3,736,653 A | * | 6/1973 | Maierson et al. .............. 228/224 |
| 4,667,869 A | * | 5/1987 | Gen et al. ....................... 228/103 |
| 5,135,982 A | | 8/1992 | Matsumoto et al. |
| 6,432,221 B1 | | 8/2002 | Seseke-Koyro et al. |
| 2006/0219756 A1 | | 10/2006 | Tada et al. |

FOREIGN PATENT DOCUMENTS

| DE | 1 930 683 | 4/1970 |
| DE | 101 08 330 A1 | 8/2002 |
| JP | 2003-311470 | 11/2003 |
| WO | WO 99/48641 | 9/1999 |
| WO | WO 2004046229 A1 * | 6/2004 |

* cited by examiner

*Primary Examiner* — Roy King
*Assistant Examiner* — Christopher Kessler
(74) *Attorney, Agent, or Firm* — Crowell & Moring LLP

(57) ABSTRACT

A flux or a flux preparation, which contains complex alkali metal fluorides and additionally includes a water-soluble polymer, preferably polyvinyl alcohol or a polyvinyl alcohol derivative. The water-soluble polymer may be contained in the flux preparation as a granulate or powder or used as a water-soluble package for the flux or flux preparation.

5 Claims, No Drawings

FLUXING AGENT

CROSS REFERENCE TO RELATED APPLICATIONS

This application is a continuation of international patent application no. PCT/EP2004/013759, filed Dec. 3, 2004 designating the United States of America, and published in German on Jun. 30, 2005 as WO 2005/058985, the entire disclosure of which is incorporated herein by reference. Priority is claimed based on Federal Republic of Germany patent application no. De 103 59 222.9, filed Dec. 17, 2003.

BACKGROUND OF THE INVENTION

The present invention relates to a fluxing agent for soldering or brazing aluminum components as well as to a method for formulating fluxes.

Assemblies of parts of aluminum or aluminum alloys or in combination with parts of suitable other materials, such as copper, brass, iron or stainless steel can be produced by brazing these parts. Techniques for brazing these components are known. The components are connected with one another by heating with the help of a brazing metal and a flux. Moreover, either the brazing metal can be used separately or components, plated with brazing metal, can be used. Advantageously, fluxes based on complex fluorometallates, such as complex alkali metal fluorides, which free the surface of the components, which are to be brazed to one another, from oxide built-ups, are used. In this connection, the flux is applied either dry or as a paste or as an aqueous suspension on the components, which are to be connected, or the components are dipped in the suspension.

As used herein, the term "flux" refers to ready-for-use compositions, which, aside from the flux, optionally contain additives. However, the flux may consist only of the fluxing agent. Examples of suitable additives which may be contained in the flux preparation include materials such as binders, dispersants, brazing metal, brazing metal precursors, solder-forming materials and/or stabilizers.

Alkali metal fluoroaluminates, alkali metal fluorosilicates and alkali metal fluorozincates are examples of fluxes based on complex fluorometallates, other known fluxes also being suitable. The fluorine compounds may be used as pure compounds or as a mixture of fluorine compounds.

As already stated, the flux or flux preparation is applied dry, as a paste or in the form of aqueous suspensions on the components, which are to be connected. To prepare the suspension, the components of the mixture are suspended in water. Because of the nature of the components, the preparation of the suspension may lead to the formation of dust or to dosing errors.

In order to prepare a paste, the flux is mixed with the additives and carrier substances, such as organic compounds. The viscosity of the preparation can be controlled by the amount of carrier substance.

SUMMARY OF THE INVENTION

Accordingly, it is the object of the invention to provide an improved flux composition for brazing aluminum or aluminum alloy components.

Another object of the present invention is to provide a flux or a flux preparation, which can be dosed better.

A further object of the invention is to provide a flux composition which avoids generation of annoying dust during the preparation of a flux suspension.

It is also an object of the invention to provide a flux composition in which the wettability of the components, which are to be brazed with the flux, and the adhesion of the flux to the components, are improved.

In accordance with a further aspect of the invention, it is an object of the invention to provide a new method of formulating a flux composition.

According to another aspect of the invention, it is an object of the invention to provide a new method of brazing an aluminum or aluminum alloy component.

These and other objects are achieved in accordance with the present invention by providing a flux composition comprising complex alkali metal fluorides and containing a water-soluble polymer.

In accordance with a further aspect of the invention, the objects are achieved by providing a method of formulating a flux composition comprising introducing a water-soluble polymer into a composition comprising a fluxing agent.

The objects are also achieved according to yet another aspect of the invention by providing an article of manufacture comprising a flux formulation composed of complex alkali metal fluorides enclosed within an outer package made of water-soluble polymer.

Further details, advantages and preferred aspects of the invention are set forth in the following description.

In accordance with the invention, a flux or a flux composition based on complex fluorometallates is provided which contains a water-soluble polymer, especially polyvinyl alcohol or polyvinyl alcohol derivatives. The water-soluble polymer may be used as an enveloping material for the flux or the flux preparation or introduced in the form of a granulate or a powder into the flux or the flux preparation. The water-soluble polymer may be used, for example, as water-soluble packaging material, especially as packaging film.

Pursuant to the invention, the flux or the flux preparation contains the water-soluble polymer in amounts of 0.005 to 10% by weight, based on the total amount of the flux or the flux preparation.

In one embodiment of the invention, the flux is packed in a pouch of water-soluble polymer film, preferably a pouch of water-soluble polyvinyl alcohol film and introduced into the aqueous suspension. A film, with a thickness of, for example, 80 μm was used.

Polyvinyl alcohol has already been produced on an industrial scale for decades. Because of its properties, polyvinyl alcohol (PVA) is used, for example, as a finishing or sizing material, as an emulsifier and has a protective colloid. Because of its high resistance to organic solvents, PVA is manufactured into gasoline- and solvent-resistant hoses, membranes, seals and hollow parts.

PVA film occupies a special position among enveloping and packaging material, since it dissolves when introduced into water. Water-soluble PVA film therefore represents only a contact protection or a dosing package. The application possibilities and the precautionary measures, which must be taken during storage and transport of PVA packages, are due essentially to the high water solubility and the hydroscopic behavior of the film.

PVA film is an ideal packaging material for substances, which are used in aqueous solution. A whole series of products, such as detergents, cleaners or agricultural chemicals, is already packaged in PVA film.

Water-soluble film can be produced from different types of polyvinyl alcohol, which differ in the degree of saponification and polymerization. Furthermore, the properties of the film can be affected by the nature and amount of plasticizers added. Useful water-soluble films are described, for example, in U.S. Pat. No. 5,135,982 (=EP 283,180), which discloses water-soluble films based on polyvinyl alcohols and, in particular, on vinyl alcohol/vinyl acetate copolymers, which have been acetalated, for example, with benzaldehyde derivatives.

It has been found that the introduction of water-soluble polymers as packaging material into the flux suspension or in granulated form into a pasty flux formulation does not have any disadvantageous effects on the brazing result. The nature and amount of the water-soluble polymer used depends on the nature and/or the formulation of the flux. In the case of a suspension, the volume of the suspension and the flux concentration in the suspension are significant. In the case of a pasty formulation, aside from the volume, the desired viscosity and knowledge of the interaction with the carrier substances are significant. It has proven to be advantageous to use the water-soluble polymer in an amount of 0.005 to 10% by weight and preferably of 0.1 to 5% by weight and particularly of 0.5 to 2% by weight (based on the total amount).

It has been found that, due to the addition of the water-soluble polymer, the coating of the components with the flux is very uniform. The wetting of the components with the flux and the adherence of the flux to the components are improved. The development of dust during the production of the preparations is reduced or no longer occurs. Dosing errors can be minimized or even excluded, since concrete packaging sizes are possible.

A further advantage is that, due to the addition of the water-soluble polymers, the amount of wetting agent can be decreased. Surfactants are usually used as wetting agents. Without the wetting agents, that is, without surfactants, the flux suspension on the surface of the aluminum would form droplets because of the force of cohesion of the water and, after drying, the flux would not be distributed homogeneously on the metal surface. The use of polyvinyl alcohol or of polyvinyl alcohol derivatives has the advantage that the surface tension of the water can be reduced, so that, in the most favorable case, an additional wetting agent becomes unnecessary. The polyvinyl alcohol or the polyvinyl alcohol derivatives act like a surfactant, are biodegradable, and do not have any known toxicological effects.

It has been found that the PVA content should be kept as low as possible, if negative effects on the brazing results cannot be tolerated.

It has proven to be advantageous to maintain a ratio of polymer (as packaging material) to flux of 0.1 to 5% by weight, and preferably of 0.5 to 2% by weight (based on the total amount), so that there is no negative effect on the brazing properties. Excessive amounts of PVA packaging can lead to discoloration at the brazing site during the brazing process.

A ratio of polymer to suspension of 0.005 to 10% by weight (based on the total amount) has a positive effect on the wetting behavior and on the exposure of the components to the flux. A uniform coating, in turn, leads to improved brazing results.

In a different embodiment, the flux or the flux preparation is applied as a paste formulation on the components, which are to be brazed. In this case, the water-soluble polymer, preferably polyvinyl alcohol or polyvinyl alcohol derivatives, is added in granulate form or as a powder to the flux preparation.

It was found that an addition of 0.1 to 5% by weight, based on the total amount of the preparation, of the polyvinyl alcohol has a thickening effect on the flux paste. Likewise, the adhesion properties of the flux paste, containing polyvinyl alcohol, are improved.

The use of polyvinyl alcohol as a component of flux formulations has, as already stated, the advantage that the surfactants, which are usually contained in the flux formulation, can be substituted. Polyvinyl alcohol is environmentally safe and does not bring about any disadvantageous reactions with the flux components or the brazing partners during the brazing process.

The following examples are intended to illustrate the invention in further detail without limiting the scope thereof.

EXAMPLE 1

Preparation of a Flux Suspension

Demineralized water is added to a container. Polyvinyl alcohol film of the G 6102.090 type from the firm Nordenia was dissolved with stirring in water. Subsequently, potassium fluoroaluminate (Nocolok™) was added. The flux produced consisted of:

18% potassium fluoroaluminate,
2% polyvinyl alcohol, and.
80% demineralized water.

EXAMPLE 2

Brazing Trials

Aluminum coupons, 25×25×0.4-1 mm, plated on one side with a brazing material and not plated, were dipped for about 30 seconds into the homogenized suspension from example 1 and subsequently dried. The distribution of the flux on the coupons was homogeneous. The adhesion of the flux to the surface was good and wipe-resistant.

In each case, 6 brazings were carried out with brazing material-plated aluminum coupons and 6 with not plated aluminum coupons. All coupons were brazed to aluminum brackets. For the not plated coupons, a piece of brazing material of AlSi 12, from 3 to 4 mm in length, was placed at the end of the bracket. The brazing trials were carried out in the type III glass brazing furnace.

| Brazing Conditions: | |
| --- | --- |
| Permanent flow of nitrogen | 11 liters/minute |
| Heating rate | 30° C./min up to a temperature of 605° C. |
| Holding time at 605° C. | 2 minutes. |
| Cooling time | 30° C./minute. |
| Result: | All coupons were brazed optimally to the brackets. |

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An article of manufacture comprising a flux formulation composed of complex alkali metal fluorides enclosed within an outer pouch made of water-soluble polymer.

2. An article of manufacture according to claim 1, wherein the outer pouch is comprised of at least one material selected from the group consisting of water-soluble polyvinyl alcohol and water soluble polyvinyl alcohol derivatives.

3. An article of manufacture according to claim 2, wherein the outer pouch consists essentially of a polyvinyl alcohol film.

4. An article of manufacture according to claim 1, wherein the outer pouch comprises a pouch of a water-soluble film of polyvinyl alcohol or a polyvinyl alcohol derivative.

5. An article of manufacture according to claim 1, wherein the complex alkali metal fluorides are selected from the group consisting of alkali metal fluoroaluminates, alkali metal fluorosilicates and alkali metal fluorozincates.

* * * * *